United States Patent [19]
Miwa et al.

[11] Patent Number: 5,343,111
[45] Date of Patent: Aug. 30, 1994

[54] CATHODE RAY TUBE AND DEGAUSSING COIL EMPLOYED THEREIN

[75] Inventors: Toru Miwa, Aichi; Yasuyuki Yamasaki, Kanagawa; Akihiko Yamagishi, Nagano, all of Japan

[73] Assignee: Sony Corporation, Tokyo, Japan

[21] Appl. No.: 959,095

[22] Filed: Oct. 9, 1992

[30] Foreign Application Priority Data

Oct. 9, 1991 [JP] Japan ................... 3-289441

[51] Int. Cl.$^5$ ............................................. H04N 9/29
[52] U.S. Cl. .................................. 313/313; 315/8; 361/149; 361/150
[58] Field of Search ............... 313/313, 402, 431, 440; 315/8, 85; 361/149, 150

[56] References Cited

U.S. PATENT DOCUMENTS

| | | | |
|---|---|---|---|
| 3,571,652 | 3/1971 | Shiobara et al. | 361/150 |
| 4,236,184 | 11/1980 | Palac et al. | 315/8 |
| 4,940,920 | 7/1990 | Giannantonio et al. | 361/150 |
| 4,963,789 | 10/1990 | Buhler | 315/8 |
| 5,216,326 | 1/1993 | Lundgren | 361/150 |

Primary Examiner—Donald J. Yusko
Assistant Examiner—N. D. Patel
Attorney, Agent, or Firm—Lewis H. Eslinger; Jay H. Maioli

[57] ABSTRACT

A cathode ray tube having degaussing coils attached to an outer side of a glass vessel of a funnel part of a main body of the cathode ray tube, in which the degaussing coils each include a flattened part, extended along the outer front surface at a front side of a funnel part, a circular part having a circular cross-section and a transition part interconnecting the end parts of the flattened part and the circular part and changed in cross-section shape from a flattened rectangle to a circle. The degaussing coil may has shape flattened partially to reduce the outer size of the cathode ray tube and includes a plastic case for retaining the coil in the flattened shape. The degaussing coil is stabilized in shape and is not deformed during transport while its attachability with respect to the cathode ray tube may be improved.

10 Claims, 17 Drawing Sheets

CATHODE RAY TUBE AND DEGAUSSING COIL EMPLOYED THEREIN

BACKGROUND OF THE INVENTION

1. Field of the Invention

This invention relates to a cathode ray tube employed in a system used for displaying video data such as a television receiver and a degaussing coil used in the tube. More particularly it relates to a cathode ray tube in which the degaussing coil is attached to the outer periphery of a funnel of the tube and is fed with an alternating current for degaussing the magnetic components provided outside and inside of the main body of the tube such as the aperture grill or frame.

2. Description of Prior Art

In a cathode ray tube, an aperture grill or a frame of a magnetic material, arranged on the inner and outer sides of the main tube body, tend to be magnetized under the influence of terrestrial magnetism. If the aperture grill or frame is magnetized, the three beams of R, G and B radiated from the electron guns cannot be converged each at a point on a phosphor screen, as a result of which the displayed picture suffers from color deviations or distortions.

For preventing such failure in convergence caused by terrestrial magnetism, a cathode ray tube is employed in which a degaussing coil is mounted on the outer side of a funnel for degaussing the magnetic components arranged on the inner and outer sides of the main tube body.

FIG.1 shows an illustrative arrangement of this type of cathode ray tube.

The cathode ray tube shown in FIG. 1 includes degaussing coils 103, 104 attached on the outer periphery of a funnel 102 of a main tube body 101. These degaussing coils 103, 104 are connected to a degaussing circuit, not shown, from which the coils are fed with alternating current which is decreased with lapse of time for degaussing the main tube body 101.

The degaussing coils 103, 104, used for the cathode ray tube, each consist in a copper wire bent into a ring and subsequently wrapped in its entirety with an electrically insulating tape, known as a UL tape, formed of an electrically insulating material, such as polyvinyl chloride, by way of an operation known as forming, so that it has a circular cross-sectional shape.

Since the conventional degaussing coil is circular in cross-section, it is partially protruded from the outer surface of the cathode ray tube, when attached thereto, thereby increasing the outer size of the cathode ray tube.

Besides, since the forming is achieved by simply wrapping the UL tape around the copper wire, a problem is raised in operability that the coil tends to be deformed during transport so that it becomes necessary to perform re-forming prior to attachment to the cathode ray tube.

OBJECTS AND SUMMARY OF THE INVENTION

It is an object of the present invention to provide a cathode ray tube in which convergence of the three beams of R, G and B may be achieved unobjectionably by degaussing the aperture grill or the frame of magnetic materials provided on the inner and outer sides of the main tube body to assure picture display in a manner free from color deviations or distortions.

It is another object of the present invention to provide a cathode ray tube fitted with degaussing coils which may be attached to the main tube body without increasing the outer size of the main tube body.

It is a further object of the present invention to provide a degaussing coil for a cathode ray tube which may be attached to the cathode ray tube with good operability without the necessity of the re-forming operation for adjusting the shape of the coil before attachment to the cathode ray tube.

In accordance with the present invention, there is provided a cathode ray tube having a degaussing coil arranged on an outer periphery of a main body of the cathode ray tube formed by a glass vessel, said degaussing coil comprising a flattened part extended along the outer front surface at a front side of a funnel part, a circular part having a circular cross-section and a transition part which interconnects the end parts of the flattened part and the circular part and which is not changed in cross-section shape from a flattened rectangle to a circle.

The degaussing coil is fed with alternating current from a degaussing circuit for degaussing magnetic materials provided on the inner and outer sides of the main body of the cathode ray tube.

Other objects and advantages of the present invention will become apparent from the following description which is made in conjunction with the drawings and the appended claims.

DETAILED DESCRIPTION OF THE PREFERRED EMBODIMENT

Figure 1:
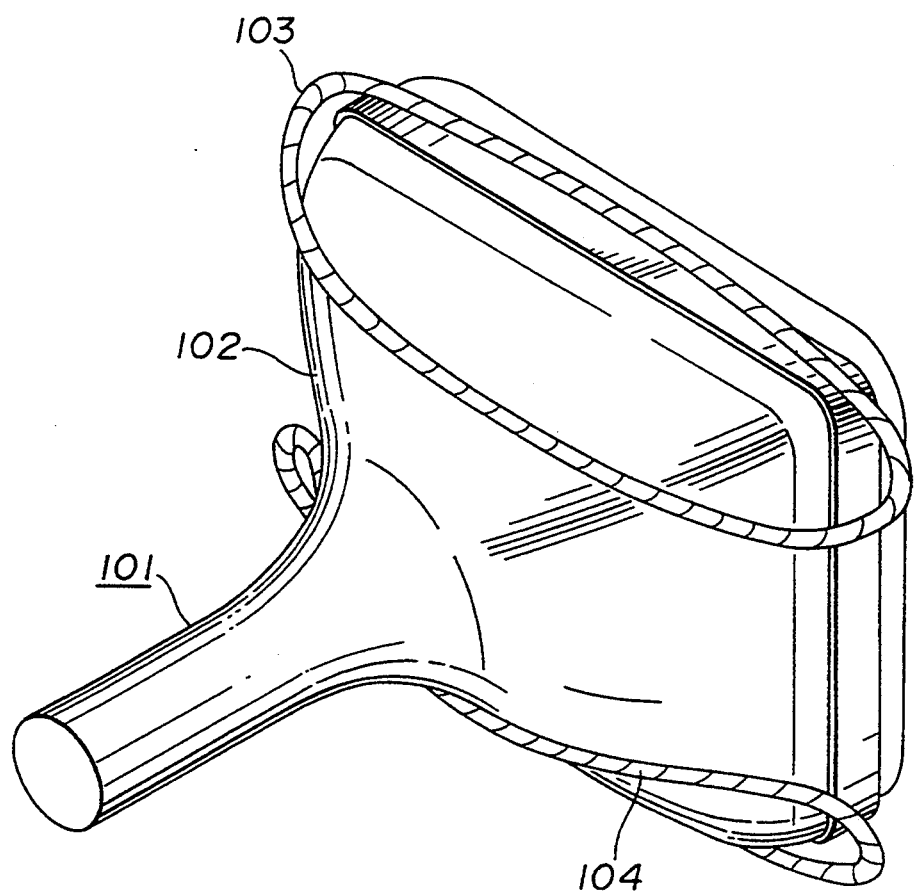
FIG. 1 is a schematic perspective view showing a conventional cathode ray tube fitted with degaussing coils.

Referring to the drawings, certain preferred embodiment of the cathode ray tube fitted with the degaussing coil will be explained in detail.

Figure 2:
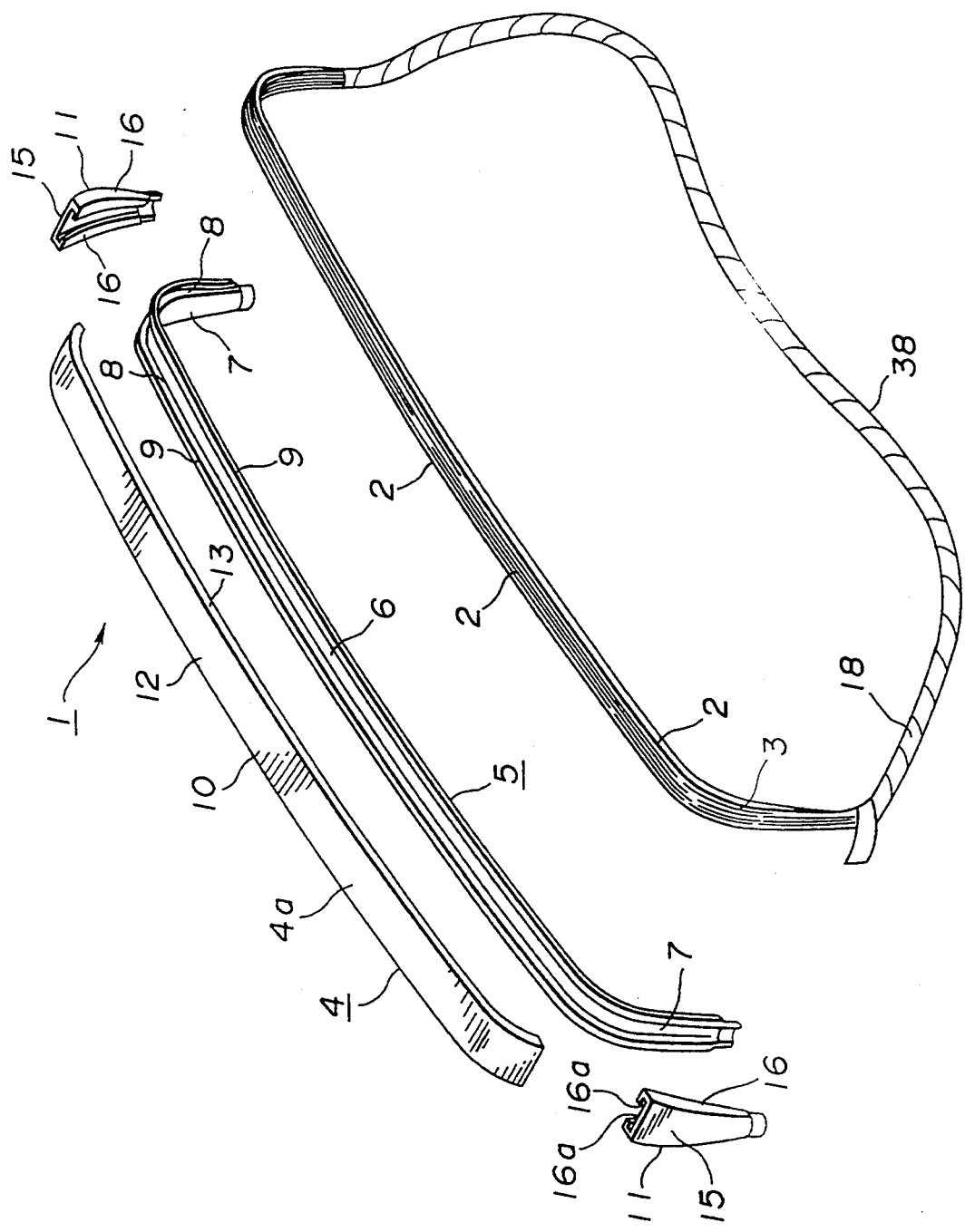
FIG. 2 is an exploded perspective view showing a degaussing coil employed in a cathode ray tube according to the present invention.
Figure 3:
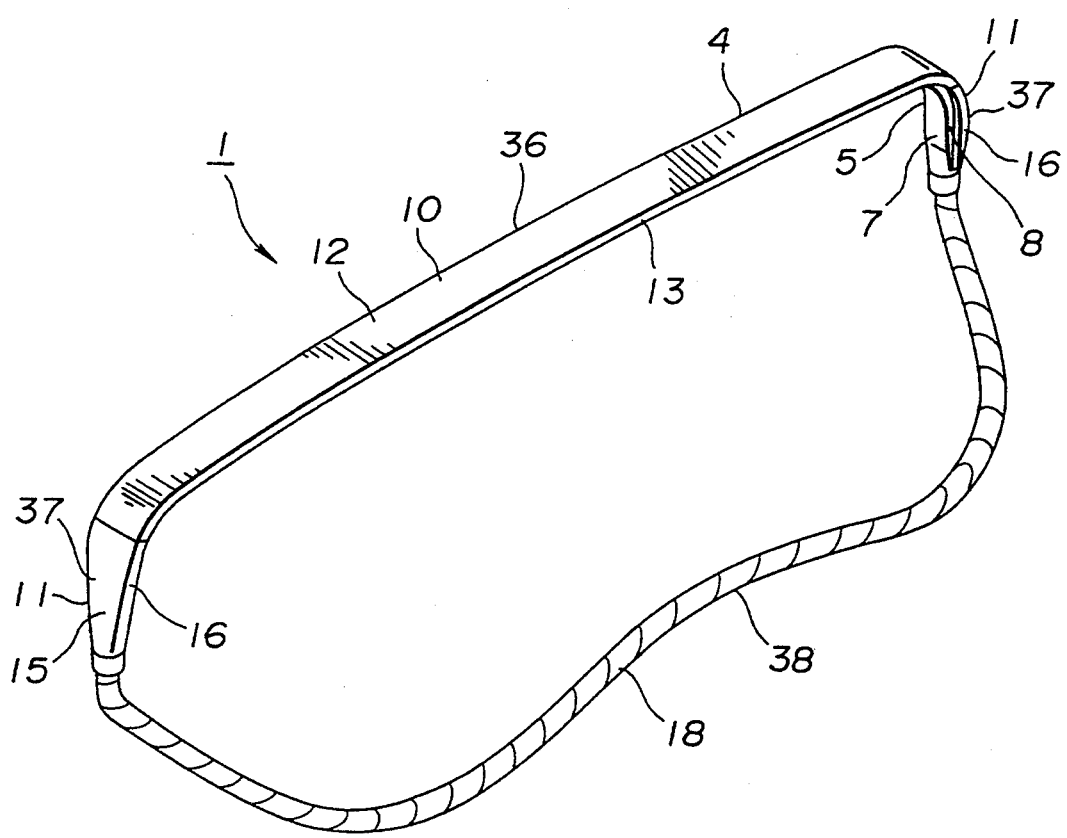
FIG. 3 is a perspective view of the degaussing coil shown in FIG. 2.

A degaussing coil 1 attached to a cathode ray tube is made up of a bundle 3 of plural ring-shaped copper wires 2, a casing 4 containing a part of the bundle 3 for adjusting its shape and a UL tape 18 wrapped around the portion of the bundle 3 exposed from the casing 4 for adjusting the cross-sectional shape of the exposed portion of the bundle 3 to a circular shape, as shown in FIGS. 2 and 3.

The casing 4 containing the bundle 3 is formed of a synthetic resin which is tough to some extent. The casing 4 is made up of a lower half 5 and an upper half 4a, which upper half is subdivided into plural portions.

The lower half 5 is integrally formed by a flattened main part 6 and transition parts 7, 7 extended at right angles to both terminal parts of the flattened main part 6. The flattened main part 6 is substantially in the shape of a strip and the transition parts 7, 7 are progressively reduced in width and become arcuate in cross-section in a direction away from the flattened main part 6.

Sidewalls 8, 8 are protuberantly formed on both longitudinal lateral sides of the lower half 5 and engaging flanges 9, 9 are protuberantly formed towards outside from the protuberant edges of the sidewalls 8, 8.

The upper half 4a is made up of main cover 10 associated with the flattened main part 6 and side covers 11, 11 associated with the transition parts 7, 7.

Figure 9:
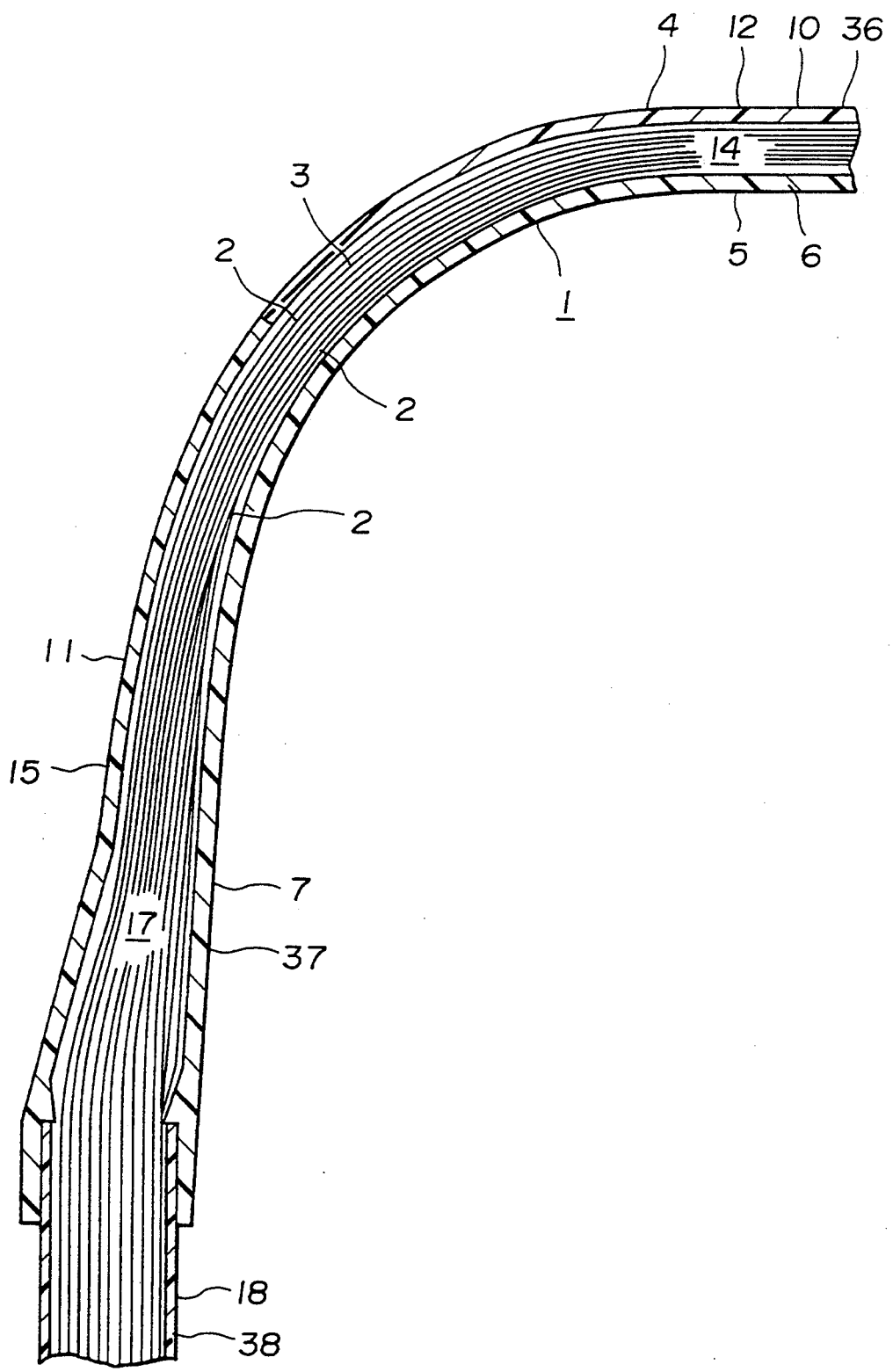
FIG. 9 is an enlarged cross-sectional view taken along line IX—IX shown in FIG. 4.

The main cover 10 is integrally formed by a strip-shaped main portion 12 and sidewall portions 13, 13 extending from the longitudinal lateral sides of the main portion 12 towards the flattened main part 12. Engaging grooves 13a, 13a are formed in facing sides of the sidewall portions 13, 13 so as to be engaged with the engaging flanges 9, 9 of the flattened main part 6 to permit the main cover 10 to be attached to the flattened main part 6 of the lower half 5 to complete an elongated space 14 having a flat rectangular cross-section as shown in FIG. 9.

Meanwhile, the main cover 10 is preferably formed of a synthetic resin having certain flexibility and elasticity to permit facilitated engagement of the engaging flanges 9, 9 of the flattened main part 6 with the engaging grooves 13a, 13a.

The side covers 11, 11 are each made up of main portions 15, 15 substantially coextensive as the transition parts 7, 7 and sidewall portions 16, 16 extending from both lateral sides of the main portions 15, 15 towards the transition parts 7, 7. Engaging grooves 16a, 16a are formed in facing surfaces of the sidewall portions 16, 16 so as to be engaged with the engaging flanges 9, 9 of the transition parts 7, 7 to permit the side covers 11, 11 to be attached to the transition parts 7, 7 of the lower half 5. In this manner, end spaces 17, 17 are defined which are progressively reduced in width and changed in cross-sectional form from a flattened rectangular shape to a circular shape in a direction away from the elongated space 14, see FIG. 9.

Meanwhile, the side covers 11 are also preferably formed of a synthetic resin having certain flexibility and elasticity to permit facilitated engagement of the engaging flanges 9, 9 of the flattened main part 6 with the engaging grooves 16a, 16a.

Figure 10:
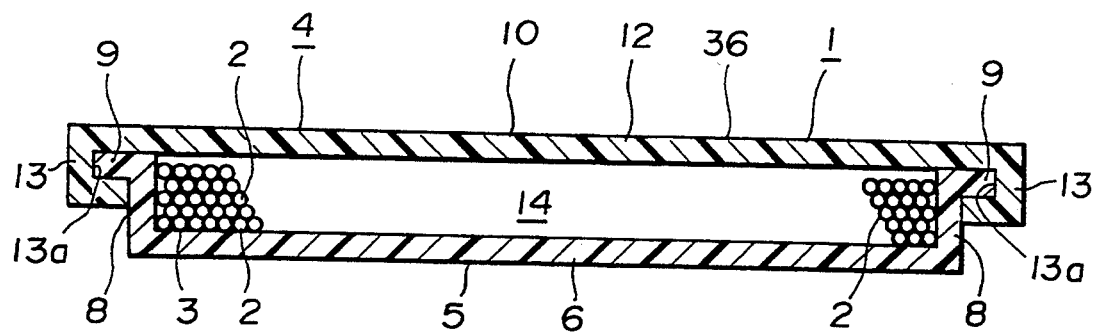
FIG. 10 is an enlarged cross-sectional view showing a flattened portion of the degaussing coil.
Figure 11:
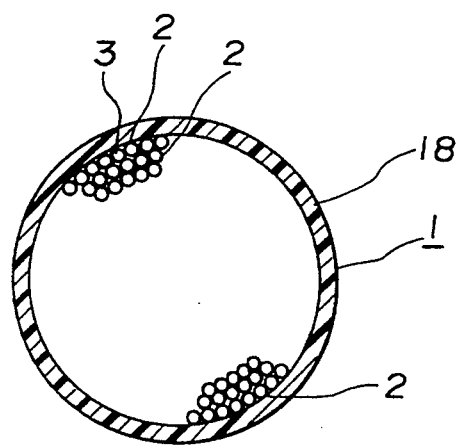
FIG. 11 is an enlarged cross-sectional view showing a circular portion of the degaussing coil.

Part of the bundle 3 of the copper wires 2 is accommodated in the spaces 14, 17, 17 so that the portion of the bundle 3 accommodated in the space 14 presents a flattened rectangular cross-section as shown in FIG. 10 while the portions of the bundle 3 accommodated in the spaces 17, 17, functioning as exit parts for the bundle 3, are gradually changed from the flattened rectangular cross-section to the circular cross-section.

The portion of the bundle 3 positioned outside the casing 4 is wrapped by UL tape 18 so that it is adjusted to a circular cross-section.

Meanwhile, form-locking connection between the lower half 5, main cover 10 and the side covers 11, 11 by engagement of the engaging flanges 9, 9 with the engaging grooves 13a, 13a, 16a, 16a may be strengthened with the aid of, for example, an adhesive or similar fastening means.

The manner of attachment of the degaussing coil 1 to the cathode ray tube is hereinafter explained.

Figure 4:
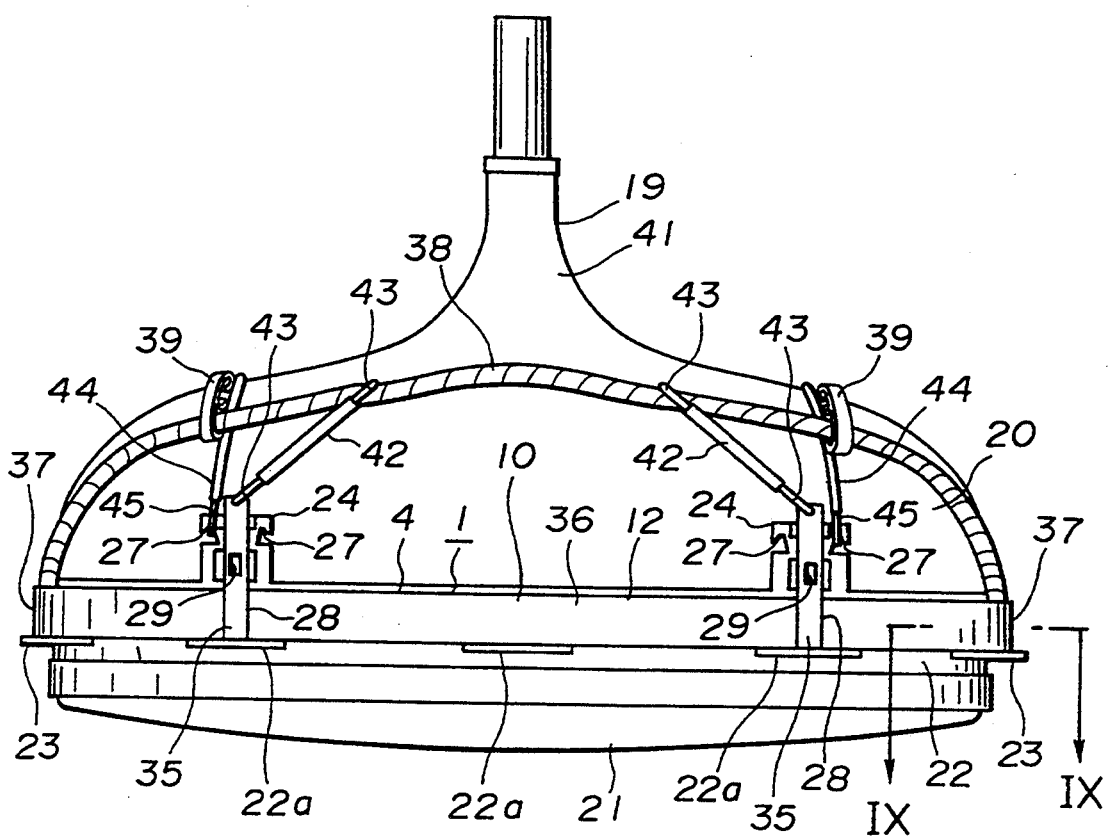
FIG. 4 is a plan view of a cathode ray tube showing the state of attachment of the degaussing coil.
Figure 5:
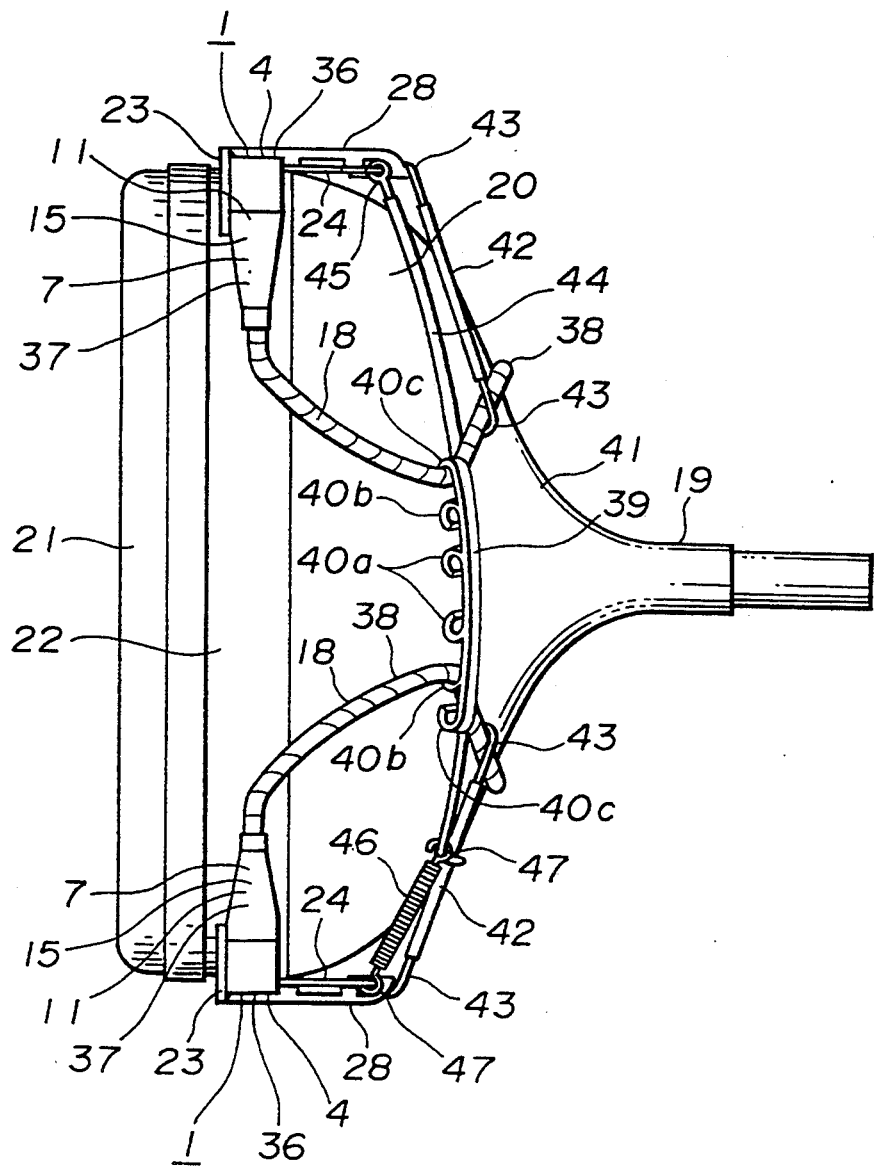
FIG. 5 is a side elevational view of a cathode ray tube showing the state of attachment of the degaussing coil.

A metal band 22 is wound about the portion of a funnel 20 of the cathode ray tube 19 disposed towards a panel surface 21, as shown in FIGS. 4 and 5. Attachment lugs 23 are provided at the four corners of the metal band 22 for attaching the metal band to a cabinet, not shown.

Figure 7:
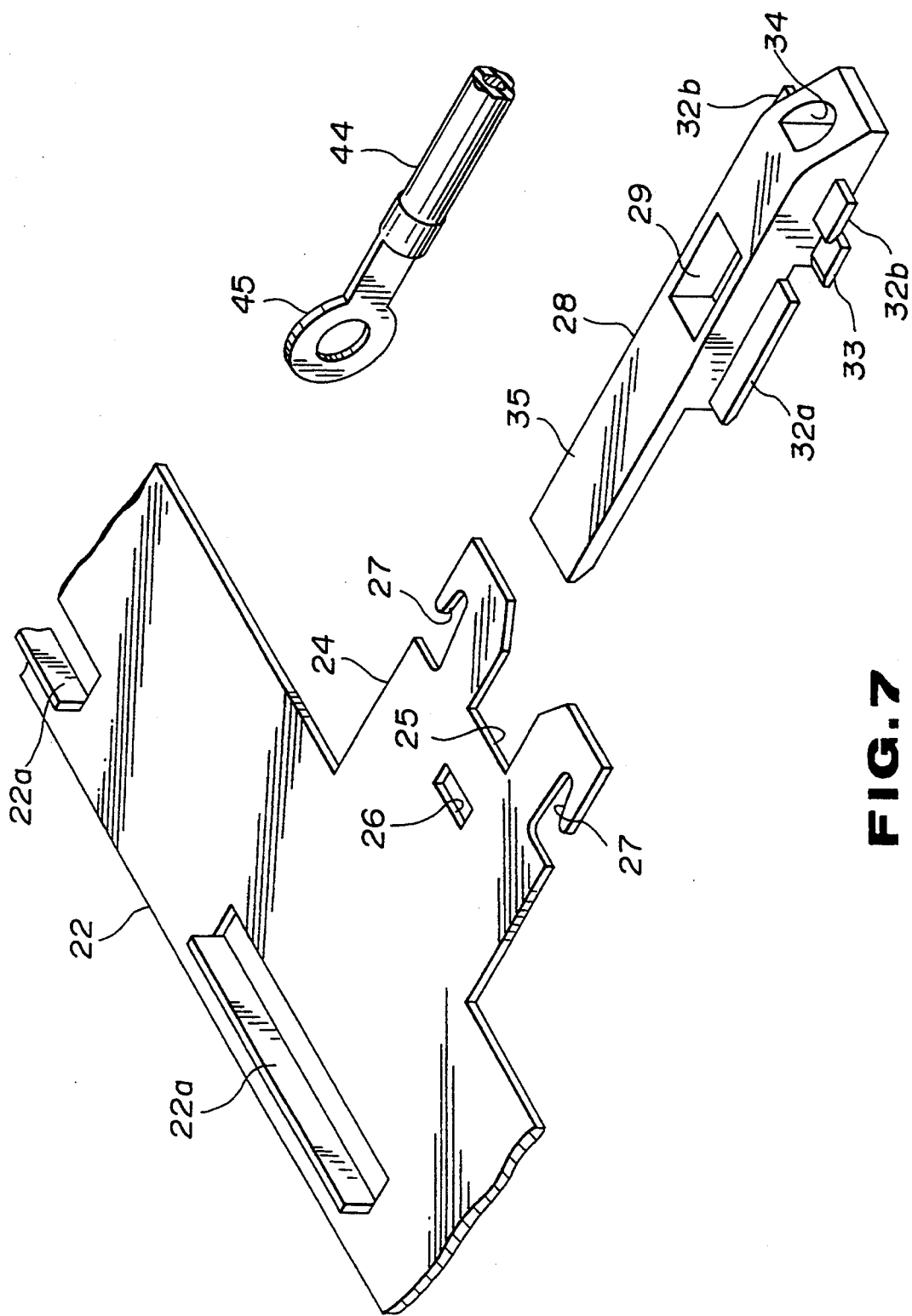
FIG. 7 is an exploded perspective view showing the coil holder prior to attachment to a supporting lug of a metal band surrounding the cathode ray tube.

Supporting lugs 24 are projectingly formed towards rear at the longitudinal rear edge of the metal band 22 towards the left and right sides of the panel surface. The rear edge of the supporting lug 24 is formed with a notch 25 having an extent about one half the length of the lug 24 in the forward and rear direction. An engaging slit 26 is bored forwardly of the forward edge of the notch 25, as shown in FIG. 7.

Hooks 27, 27 are formed by partially removing both lateral sides of the supporting lug 24.

The degaussing coils 1, 1 are attached by means of plural coil holders 28, 28 to the metal band 22 wound about the cathode ray tube 19. These coil holders 28, 28 are formed of synthetic resin exhibiting flexibility and elasticity to some extent.

The coil holder 28 is elongated in length in the forward and rear direction and has a planar major surface and an opposite major surface having three steps so that the regions defined by these steps will be closer to the one major surface the closer the regions are disposed to the forward side of the cathode ray tube. A through-hole 29 is formed in the mid part of the coil holder 28 in the direction of thickness of the coil holder 28, see FIG. 7.

Figure 8:
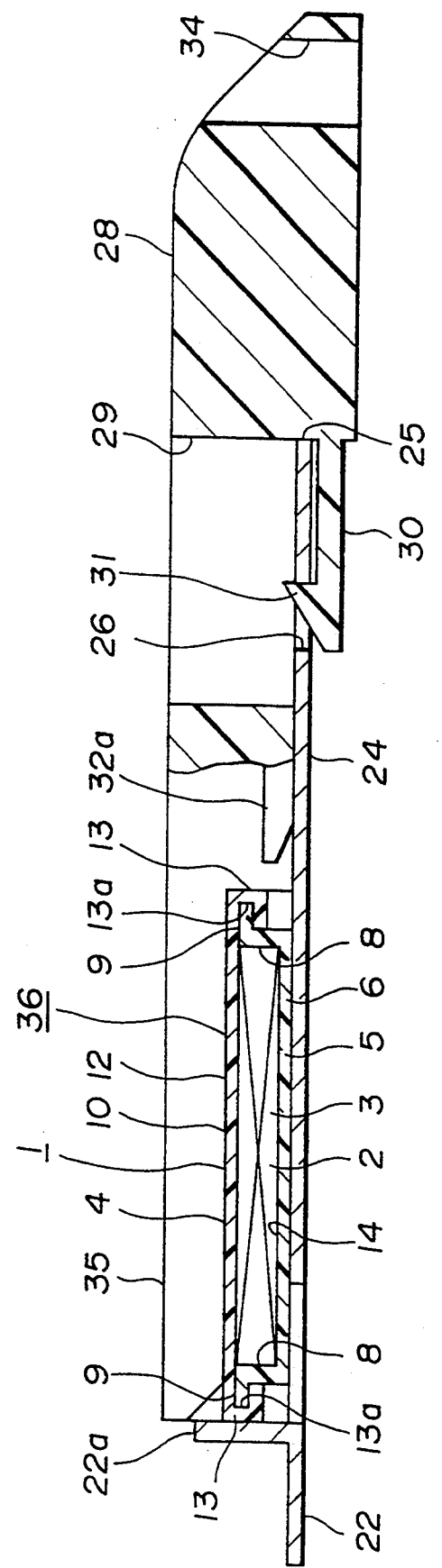
FIG. 8 is an enlarged perspective view showing the state in which a coil holder is attached to a supporting lug of a metal band.

An engaging extension 30 is provided for extending forwardly from the forward edge of the opposite major surface of a rear section of the coil holder 28, see FIG. 8. An engaging pawl 31 is formed at a forward part, of the extension 30 for extending towards the through-hole 29.

The sides of the rear part are formed with lateral extensions 32a, 32a, 32b, 32b, 33 and 33 which are spaced from each other in the forward and rear direction while being slightly offset from each other in the direction of thickness of the lateral extensions. These lateral extensions are arrayed in the order of 32a, 33 and 32b and a gap corresponding to the thickness of the supporting lug 24 is left between the extensions 32a, 32b on one hand and the extension 33 on the other hand. Besides, the forward end faces of the lateral extensions 32a, 32a, 32b, 32b, 33 and 33 are inclined slightly in a direction towards one another.

A retention hole 34 is formed at the rear end of the rear part of the coil holder 28.

A forward end 35 of the coil holder 28 plays the part of a retainer for thrusting the degaussing coil 1 against the metal band 22.

Figure 6:
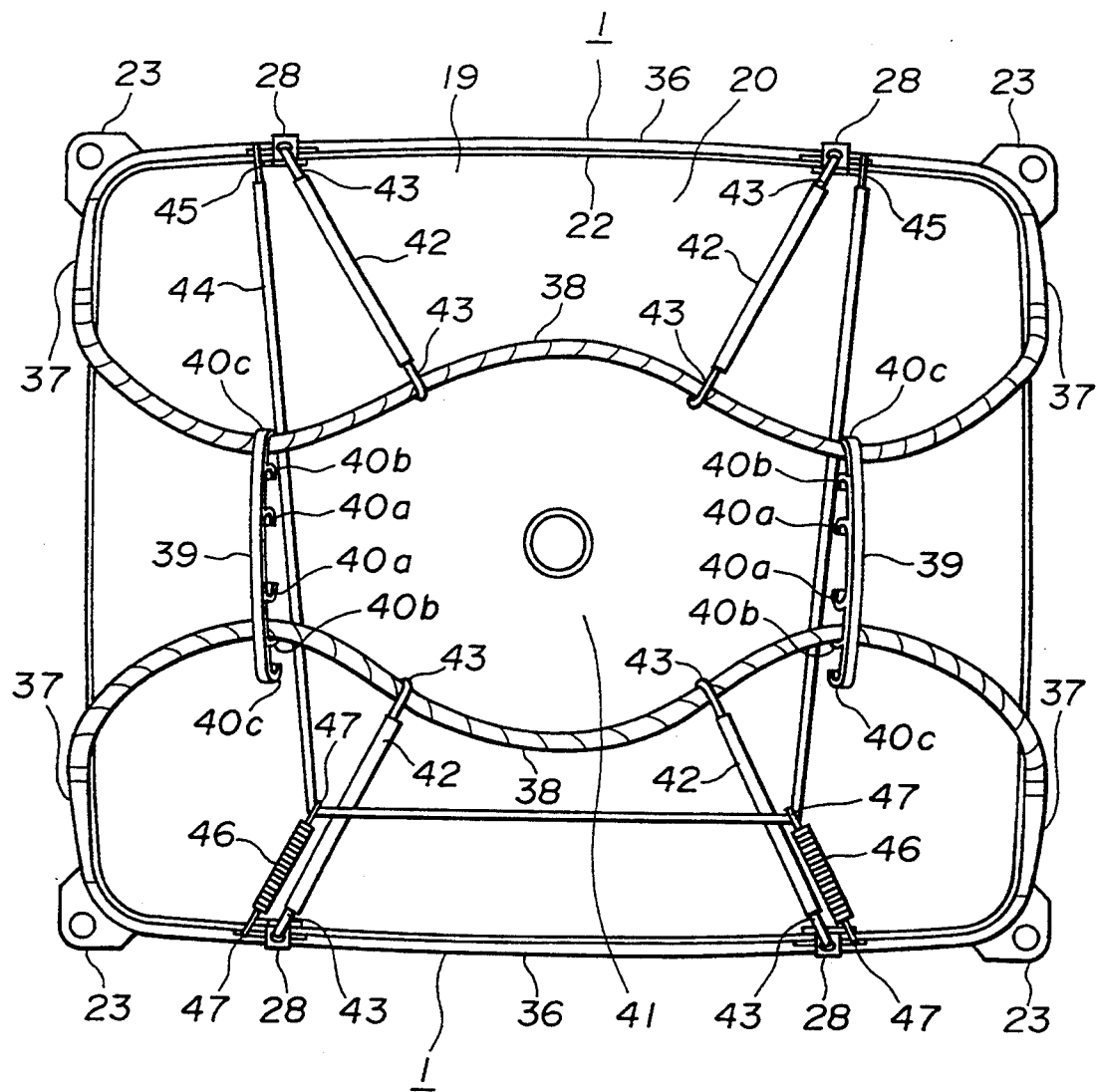
FIG. 6 is a back side view of a cathode ray tube showing the state of attachment of the degaussing coil.

As shown in FIGS. 6, 8, and 9, the degaussing coil 1 is positioned so that its flattened portion 36 defined by the flattened main part 6 of the lower half 5 and the main cover 10 of the upper half 10 is abutted against, a longer side of the metal band 22, its transition portions 37, 37 defined by the transition parts 7, 7 of the lower half 5 and the side covers 11, 11 of the upper half 4 are extended along shorter sides of the metal band 22 and its circular portion 38 wrapped with UL tape 18 is extended along the funnel 20. Meanwhile, the forward end of the flattened portion 36 is abutted on abutments 22a formed by partially segmenting the metal band 22.

With the degaussing coil 1 placed as described above, the coil holders 28, 28 are attached to the supporting lugs 24, 24 of the metal band 22 for having the flattened portion 36 of the degaussing coil 1 supported by the metal band 22.

That is, with the flattened portion 36 of the degaussing coil 1 placed on the metal band 22, the extension 30 of the coil holder 28 is positioned in the notch 25 of the supporting lug 24 of the metal band 22. In this state, the coil holder 28 is advanced until the supporting lug 24 is positioned between a mid part of the coil holder 28 and the extension 30. The forward end face of the rear part of the coil holder 28 then is abutted against the forward edge of the notch 25. At this time, the engaging pawl 31 of the coil holder 28 is engaged with the engaging through-hole 26 in the supporting lug 24 to inhibit detachment of the coil holder 28 from the supporting lug 24.

Besides, the portions of the supporting lug 24 disposed on both sides of the notch 25 are positioned between the lateral extensions 32a, 32a, 32b, 32b, 33 and 33 as viewed in the forward and rear direction to enable the coil holder 28 to be maintained in stability with respect to the metal band 22, see FIGS. 7 and 8.

With the coil holder 28 thus supported by the supporting lug 24 of the metal band 22, the thrusting end part 35 of the coil holder 28 is abutted against the surface of the flattened portion 36 of the degaussing coil 1 opposite to its surface contacted with the metal band 22, so that the flattened part 36 is sandwiched between the metal band 22 and the thrusting end part 35 of the coil holder 28.

Thus the degaussing coil 1 is attached to the funnel 20 of the cathode ray tube 19 by the metal band 22 by having its flattened part 36 placed on the metal band 22 and by having the coil holders 28, 28 attached to the metal band 22.

The other degaussing coil 1 may be attached to the funnel 20 of the cathode ray tube 19 in the similar manner.

The degaussing coils 1, 1, attached to the funnel 20 of the cathode ray tube 19, are held by coil holding bands 39, 39 having three sets of hooks 40a, 40a, 40b, 40b, 40c, 40c having different intervals from one another, see FIGS. 5 and 6. That is, the two coil holding bands 39, 39 are attached between the circular sections 38, 38 of the degaussing coils 1, 1 on both sides of a neck 41 of the cathode ray tube 19 by taking advantage of desired ones of the hooks 40a to 40c. That is, by the coil holding bands 39, 39 placed across the circular sections 38, 38 of the degaussing coils 1, 1, these circular sections are drawn closer towards each other and into abutment with the funnel 20 of the cathode ray tube 19.

Two coil suspension bands 42, 42 are placed across the coil suspension holders 28, 28 and the circular portions 38, 38 of the degaussing coils 1, 1. That is, each of the coils suspension bands 42, 42 has its hook 43 retained by engaging holes 34 of the coil holders 28, 28, while having its other hook 43 retained by a part of the circular section 38 of the degaussing coil 1 which is further away from the flattened part 36 of the degaussing coil than the part of the circular section 38 retained by the hook 40 of the coil holding band 39.

The circular sections 38, 38 of the degaussing coils 1, 1 are tightened by means of the coil holding bands 39, 39 and the coil suspension bands 42, 42 so that the circular sections of the degaussing coils 1, 1 are securely mounted on the outer side of the funnel 20 of the cathode ray tube 19.

A braided wire formed by weaving thin electrically conductive wires 44 has its terminal ends 45, 45 retained by hooks 27, 27 of supporting lugs 24, 24 of the metal band 22 supporting the associated degaussing coil 1, as shown in FIGS. 4, 5, and 6.

Tension coil Springs 46, 46 have end hooks 47, 47 which are engaged in hooks 27, 27 of the supporting lugs 24, 24 of the metal band 22 opposite to those retained by both ends of the braided wire 44. Besides, the tension coil Springs 46, 46 have opposite side hooks 47, 47 retained by intermediate portions of the braided wire 44, so that the braided wire 44 is tightened and brought into tight contact with he funnel 20 of the cathode ray tube 19.

Meanwhile, the degaussing coils 1, 1 are connected to an electric circuit, not shown, by a connector, also not shown.

Since the flattened parts 36, 36 of the above-described degaussing coils 1, 1 are located at the maximum outer size part of the funnel 20 of the cathode ray tube 19, the degaussing coils are protruded outward only to a minimum extent and inwardly of the lugs 23, 23 of the metal band 22, so that there is no risk that the outer size of the cathode ray tube 19 be increased due to attachment of the degaussing coils 1, 1.

Besides, since the shape of the flattened part 36 or the transition part 37, which are critical parts from the view point of attachment to the cathode ray tube 19, is preset by the casing 4, there is no fear that the degaussing coil be collapsed in shape during transport, and there is no necessity of re-forming at the time of attachment to the cathode ray tube 19.

Figure 12:
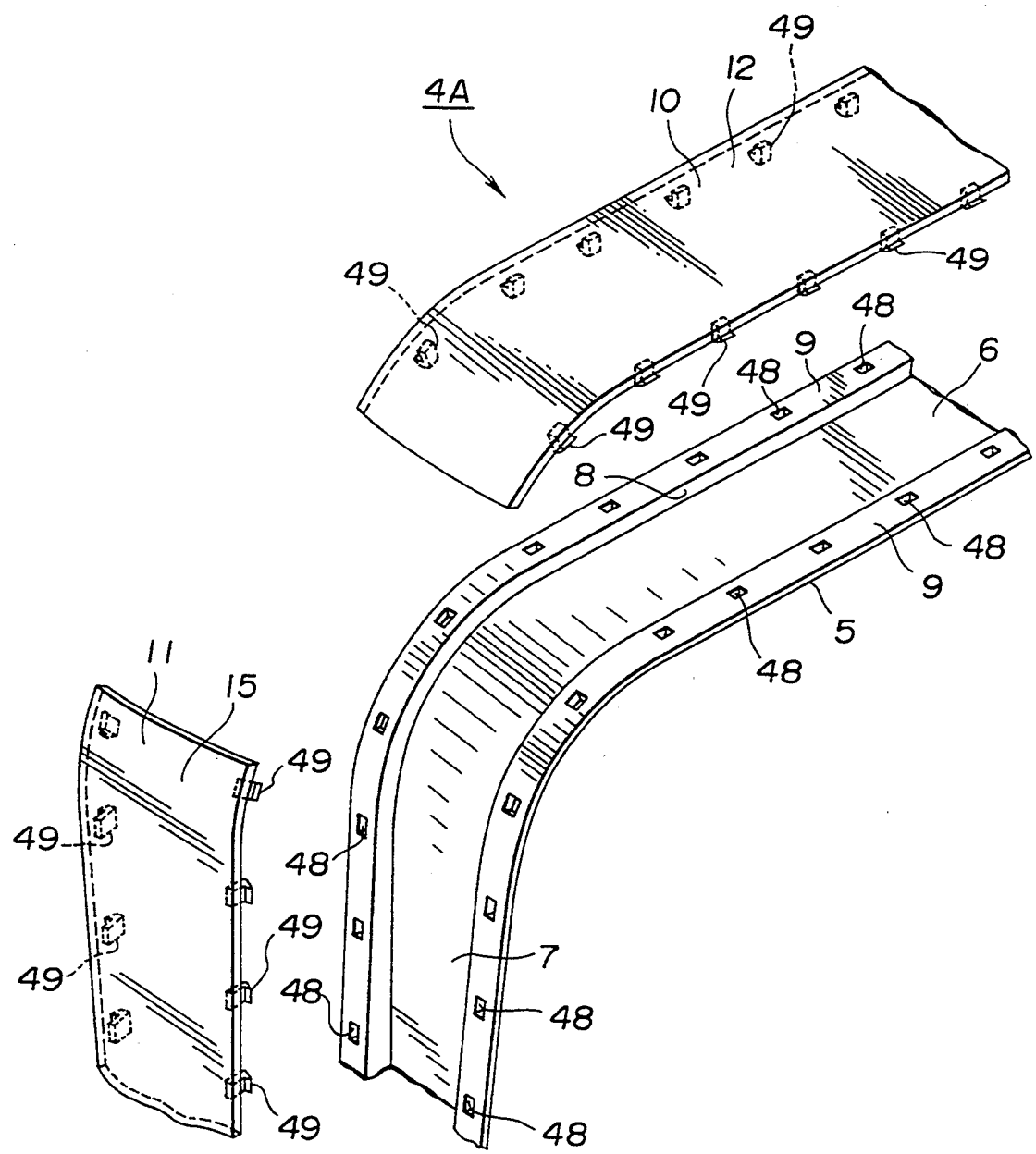
FIG. 12 is an exploded perspective view showing a casing containing a bundle of copper wires making up a degaussing coil.
Figure 13:
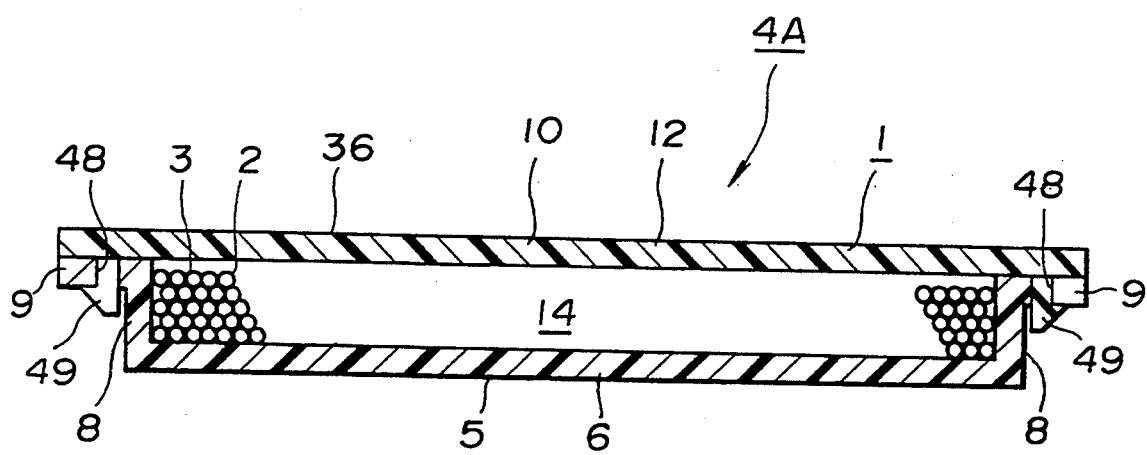
FIG. 13 a cross-sectional view showing the casing of FIG. 12 in the closed state.

FIGS. 12 and 13 show a modified embodiment of the casing 4.

A casing 4A has a lower casing member 5 having engaging edges 9, 9 formed with plural engaging holes 48 and a side cover 10 and both side covers 11, 11, instead of having sidewalls 13, 13, 16, 16, having engaging grooves 13a, 13a, 16a, 16a, are provided with engaging pawls 49 extended towards the lower casing member 5 for being engaged with the engaging holes 48 in the lower casing member 5 for connecting the main cover 10 and the side covers 11, 11 to the lower casing member 5.

Figure 14:
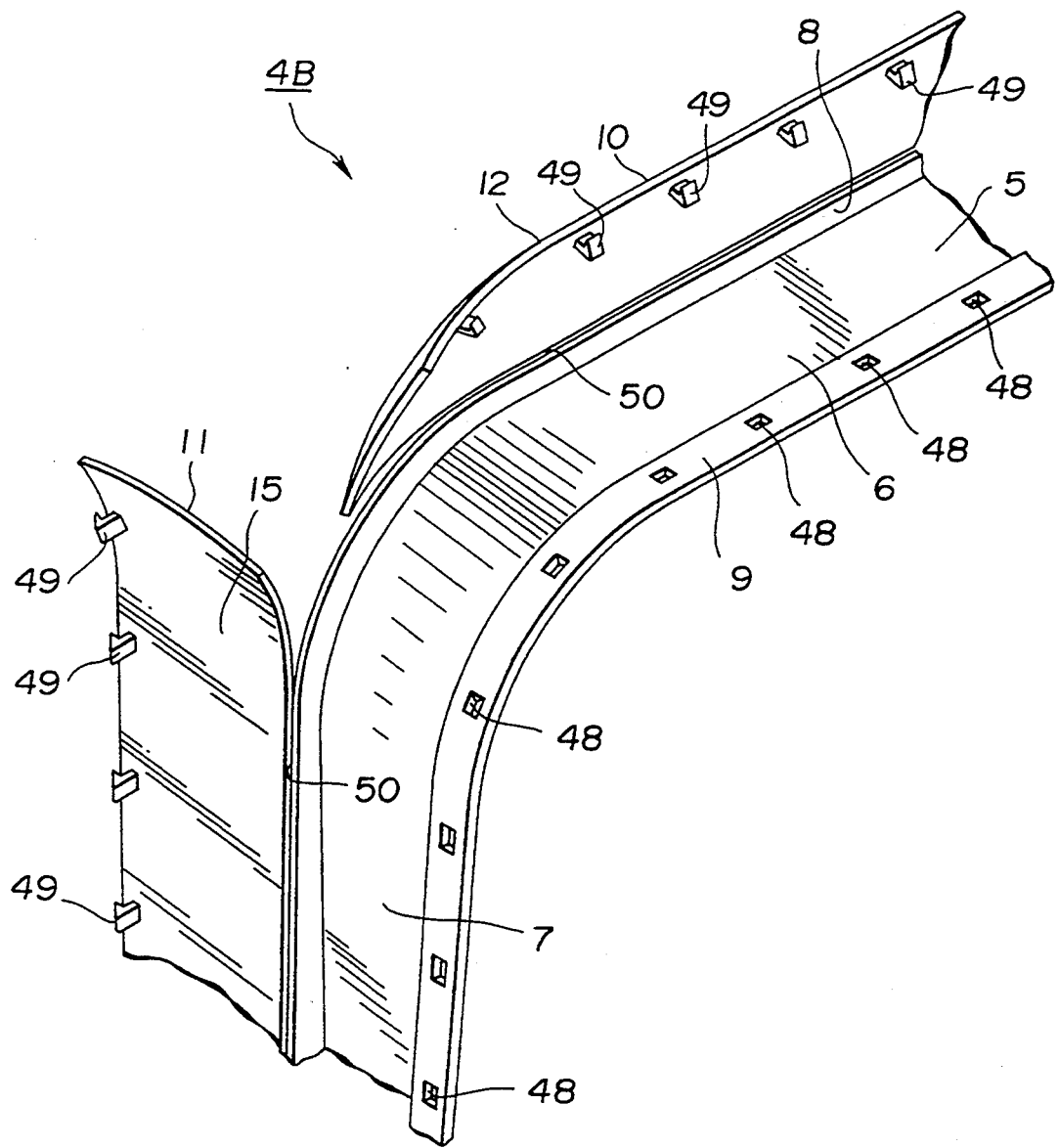
FIG. 14 is an exploded perspective view showing a modification of a casing containing a bundle of copper wires making up a degaussing coil.
Figure 15:
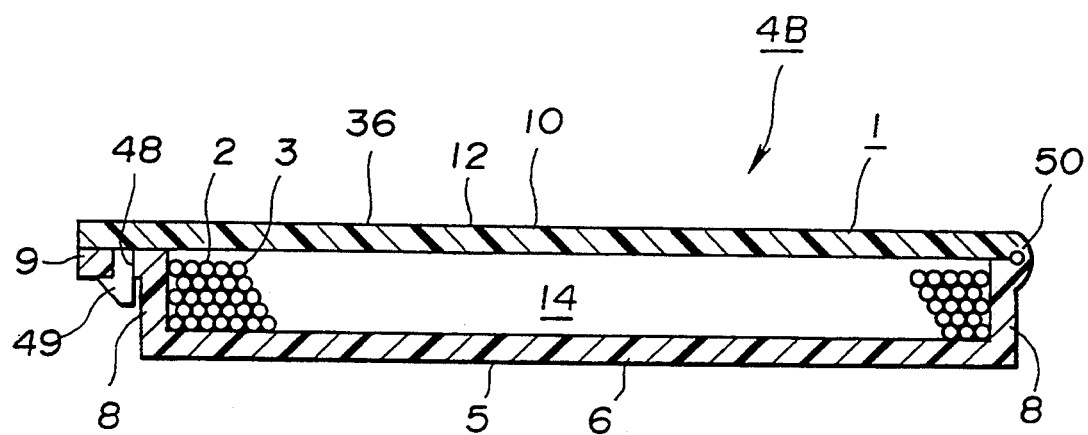
FIG. 15 is a cross-sectional view showing the casing of FIG. 14 in the closed state.

FIGS. 14 and 15 show another modified embodiment of the casing 4.

A casing 4B is free of the engaging edges 9 on one of the sidewalls 8 of the lower casing 5 and the sidewall thus freed of the engaging edges is integrally connected to associated side edges of the main cover 10 and he side covers 11, 11 by means of a thin-walled hinges 50.

The engaging edge of the opposite side sidewall 8 of the lower casing member 5 is formed with plural engaging holes 48, while engaging pawls 49 are formed for being extended from the opposite side edges of the main cover 10 and the side covers 11, 11, these engaging pawls being engaged with the engaging holes 48, 48 in the lower casing 5 for connecting the main cover 10 and the side covers 11, 11 to the lower casing member 5.

Figure 16:
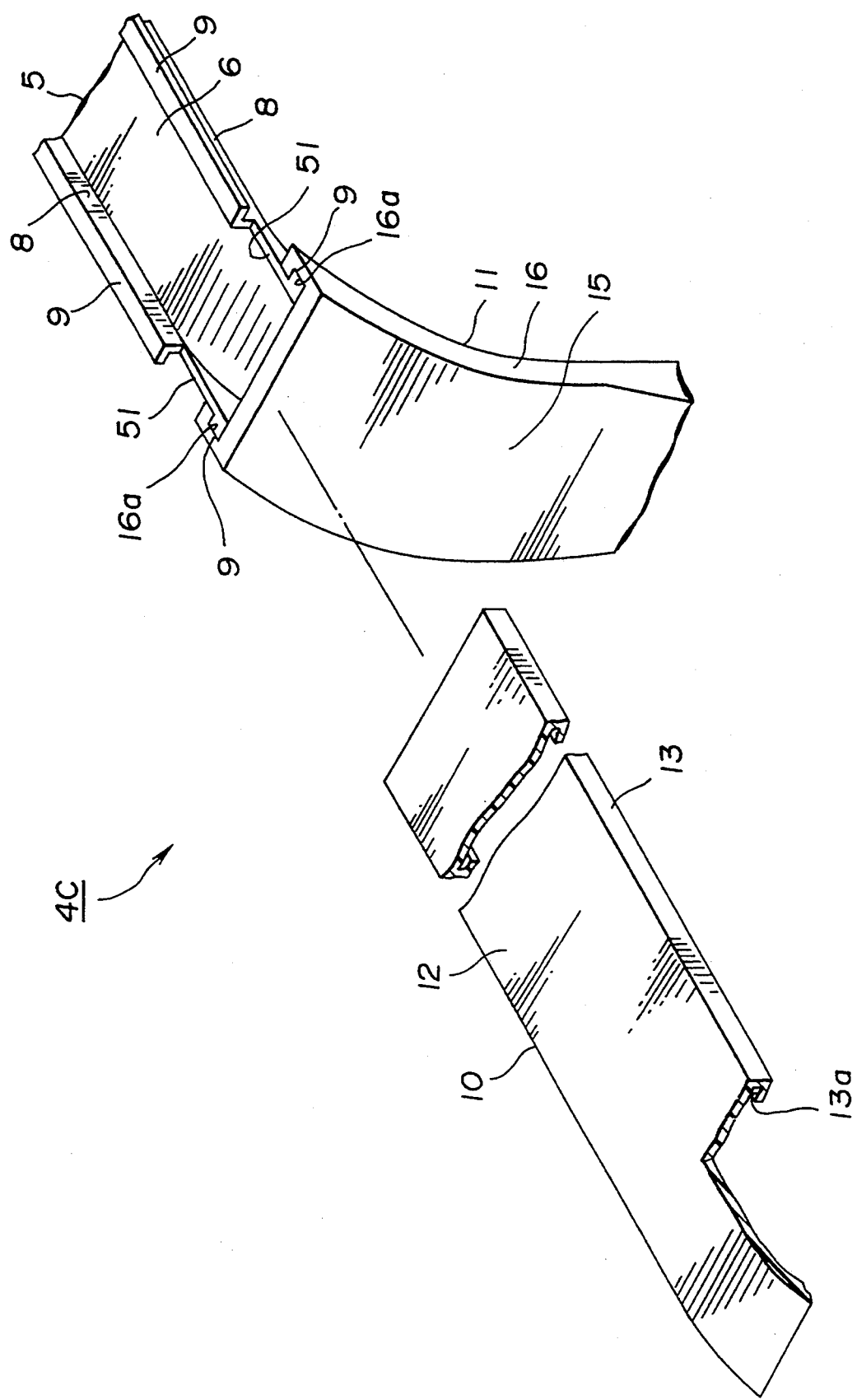
FIG. 16 is an exploded perspective view showing another modification of a casing containing a bundle of copper wires making up a degaussing cool, with the casing being shown in a state prior to closure.
Figure 17:
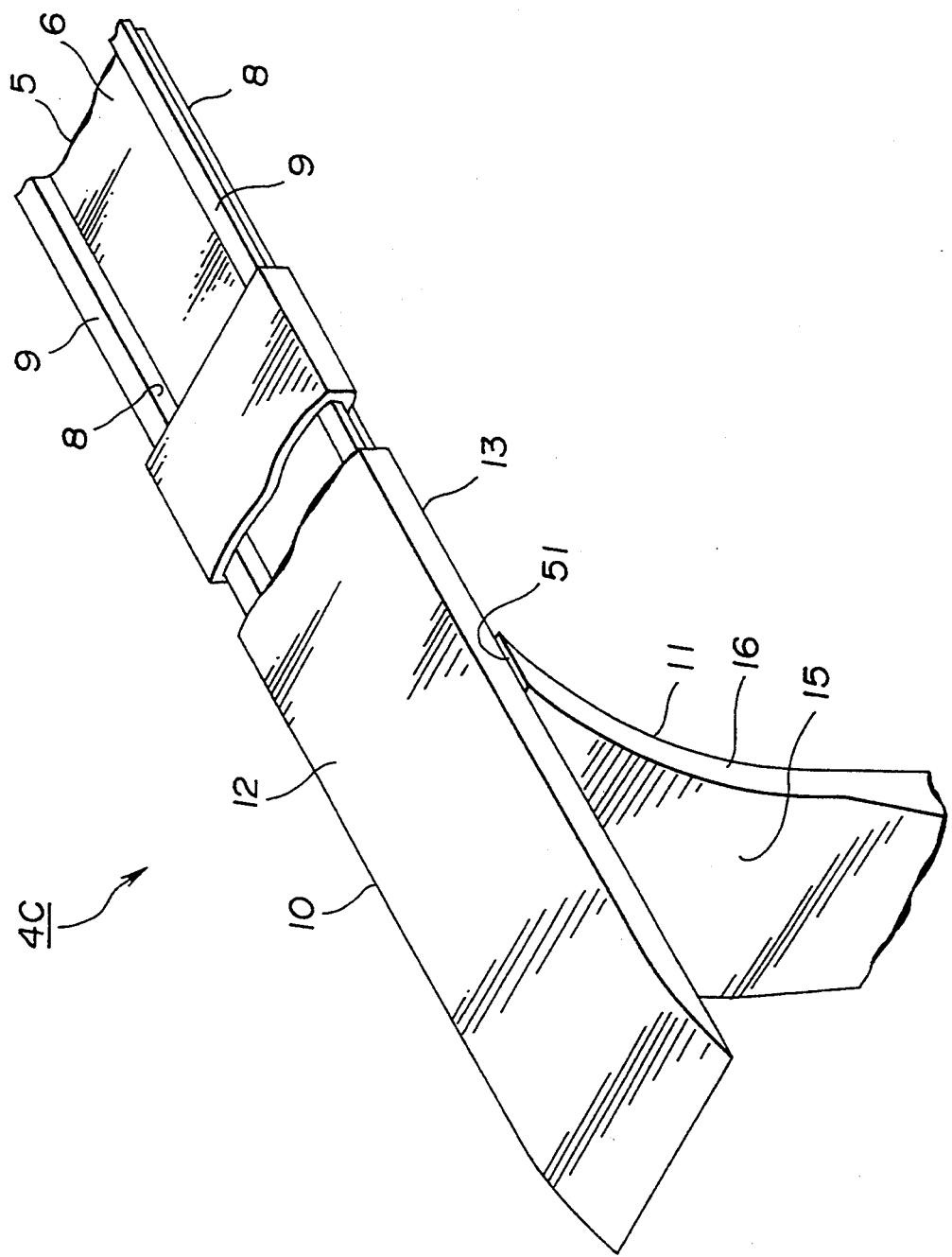
FIG. 17 is a perspective view showing the casing of FIG. 16 as it is being closed.
Figure 18:
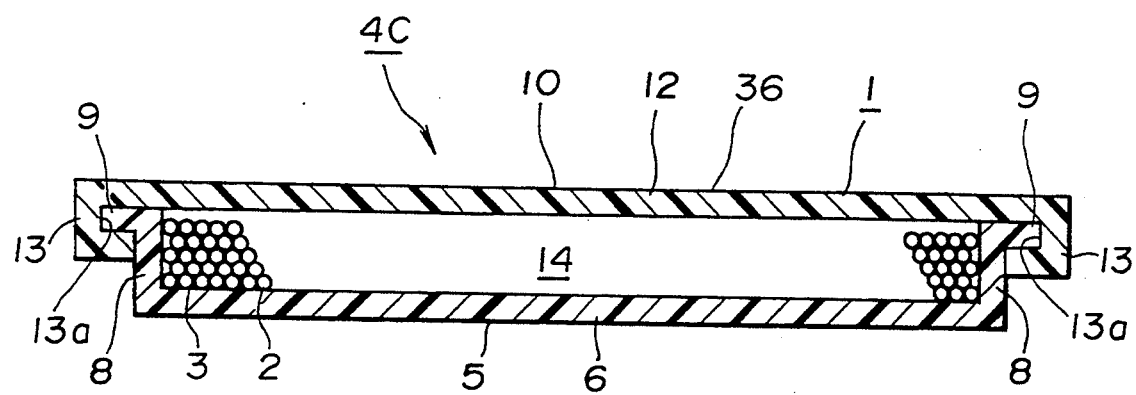
FIG. 18 is a cross-sectional view showing the casing of FIG. 16 in its closed state.

FIGS. 16 to 18 show still another modified embodiment of the casing 4.

A casing 4C has a lower casing member 5 having its engaging edges 9, 9 interrupted in the portions of the transition parts 7, 7 contiguous to the flattened main part 6 to form interrupted portions 51, 51 at which the engaging edges 9, 9 of the flattened main part 6 are engaged with engaging grooves 13a, 13a as the man slide 10 is slid over the lower casing member 5.

With the present modification, the main Cover 10 may be formed of a material with increased toughness to elevate shape retention characteristics of the flattened main part 36.

What is claimed is:

1. A cathode ray tube having a degaussing coil arranged on an outer periphery of a funnel part of a main body of the cathode ray tube formed by a glass vessel, said degaussing coil comprising: a bundle of copper wires partially contained within a plastic casing including an elongated flattened part extended along an outer front surface at a front side of the funnel part, and first and second transition parts, said transition parts arranged at respective ends of said elongated flattened part and interconnecting the ends of the flattened part and a circular part of said coil and being changed in cross-section shape from a flattened rectangle to a circle.

2. The cathode ray tube as defined in claim 1 wherein
    a portion of the bundle contained in the elongated flattened part of said casing being shaped into a cross-sectional shape of a flat rectangle,
    a portion of the bundle contained in the first and second transition parts of said casing being shaped into a transition portion which is changed in cross-sectional shape from a flat rectangle to a circle, and
    a portion of the bundle extracted from said casing forming said circular part of said coil and extending between said first and second transition parts of said casing being wrapped by an electrically insulating tape and adjusted to a substantially circular cross-section.

3. The cathode ray tube as defined in claim 2 wherein
    said casing containing part of the bundle of ring-shaped copper wires for shaping the contained part thereof is made up of a lower casing and an upper casing,
    said lower casing having an elongated flattened part and transition parts extended from both ends of the flattened part at substantially right angles to said flat portion, said transition parts being gradually reduced and becoming circular in cross-section, and
    said upper casing is made up of a main cover associated with and covering said flattened part and side covers associated with and covering said transition parts.

4. A cathode ray tube as defined in claim 3 wherein said upper casing and the lower casing making up the casing are engaged with each other by engaging grooves and engaging edges formed in said lower casing and the upper casing, respectively.

5. A cathode ray tube as defined in claim 3 wherein said upper casing and the lower casing making up the casing are engaged with each other by engaging pawls formed in said upper casing in engaging holes formed in the engaging edges of said lower casing.

6. A cathode ray tube as defined in claim 3 wherein said upper casing and the lower casing making up the casing are openably engaged with each other by a thin-walled hinge.

7. The cathode ray tube as defined in claim 3 wherein the flattened main part of the lower casing is covered by a main cover plate slidably attached to said lower casing.

8. The cathode ray tube as defined in claim 1 wherein said degaussing coil is mounted by having the elongated flattened part of said casing attached along an upper length of a metal band wound about the outer periphery of the main body of the cathode ray tube, by having the transition parts on both ends of the flattened part of said casing attached along respective sides of said metal band and by having the circular part extended along the funnel part of the cathode ray tube.

9. The cathode ray tube as defined in claim 8 wherein said degaussing coil has the elongated flattened part of said casing supported by coil holders formed on said metal band.

10. The cathode ray tube as defined in claim 8 wherein a pair of degaussing coils are attached to the main body of the cathode ray tube, and wherein the degaussing coils have their circular parts drawn towards each other into abutment contact with the funnel of the cathode ray tube,
    the degaussing coils being attached to the main body of the cathode ray tube by being tightened by coil suspension bands placed between the circular parts and coil holder supporting the flattened part by a metal band.

* * * * *

UNITED STATES PATENT AND TRADEMARK OFFICE
CERTIFICATE OF CORRECTION

PATENT NO. : 5,343,111
DATED : August 30, 1994
INVENTOR(S) : Toru Miwa, Yasuyuki Yamasaki and Akihiko Yamagishi It is certified that error appears in the above-indentified patent and that said Letters Patent is hereby corrected as shown below:

```
In the Abstract, line 4, after "part" delete ","
         line 10, delete "may"
         same line, after "has" insert --the--
Col. 1, line 10, after "particularly" insert --,--
        line 15, after "tube" insert --,--
Col. 2, line 64, after "13" insert --is--
Col. 3, lines 14 & 15, change "embodiment" to --embodiments--
        line 52, after "cross-section" insert --,--
Col. 4, line 62, after "part" delete ","
Col. 5, line 17, after "against" delete","
Col. 6, line 32, change "Springs" to --springs--
        line 36, change "Springs" to --springs--
Col. 7, line 27, change "Cover" to --cover--

Col. 8, line 56, change "holder" to --holders--
```

Signed and Sealed this

Twenty-sixth Day of September, 1995

Attest:

BRUCE LEHMAN

*Attesting Officer*  *Commissioner of Patents and Trademarks*